(12) United States Patent  (10) Patent No.: US 7,444,350 B1
MacKinnon et al.  (45) Date of Patent: Oct. 28, 2008

(54) METHOD AND APPARATUS FOR PROCESSING MANAGEMENT INFORMATION

(75) Inventors: Gregory MacKinnon, Somerville, MA (US); John P. Sheehy, Jr., Braintree, MA (US)

(73) Assignee: EMC Corporation, Hopkinton, MA (US)

( * ) Notice: Subject to any disclaimer, the term of this patent is extended or adjusted under 35 U.S.C. 154(b) by 533 days.

(21) Appl. No.: 11/095,421

(22) Filed: Mar. 31, 2005

(51) Int. Cl.
*G06F 17/30* (2006.01)
(52) U.S. Cl. .................................................. 707/102
(58) Field of Classification Search ................ 707/1, 707/5, 7, 102, 203, 204, 205; 711/2, 3, 4, 711/129; 370/254; 716/8
See application file for complete search history.

(56) References Cited

U.S. PATENT DOCUMENTS

| | | | | |
|---|---|---|---|---|
| 4,930,072 | A * | 5/1990 | Agrawal et al. | 707/101 |
| 5,497,486 | A * | 3/1996 | Stolfo et al. | 707/7 |
| 5,884,944 | A * | 3/1999 | Durham | 283/67 |
| 6,892,198 | B2 * | 5/2005 | Perisic et al. | 707/5 |
| 7,020,697 | B1 * | 3/2006 | Goodman et al. | 709/223 |
| 2006/0059253 | A1 * | 3/2006 | Goodman et al. | 709/223 |

OTHER PUBLICATIONS

Y.Y.Yao, "A partition model of granular computing", Jun. 2004, Dept. of Computer Science, University of Regina, Canada, http://www2.cs.uregina.ca, pp. 1-22.*

Jiang, Bin, A Suitable Algorithm for computing partial transitive closures in databases, Inst. of Information Systems, 1990, IEEE, Proced Sixth Conference, pp. 264-271.*

* cited by examiner

*Primary Examiner*—Diane Mizrahi
(74) *Attorney, Agent, or Firm*—Chapin IP law, LLC; Barry W. Chapin, Esq.

(57) ABSTRACT

An agent collecting management data from the resource operating in the managed network to form a management data set and identifies segregated regions of management data within the management data set. Each segregated region is a respective partial transitive closure of the collected management data taken over a graph representing the entire management data set. For each segregated region of management data, the agent partitions that segregated region of management data into a set of logical partitions and transfers each logical partition of the segregated region of management data to a network management application in the managed network for access by the network management application. A network management application receives the partitions and only needs to keep objects in memory related to partitions that are currently received and being processed thus saving memory and processing resources.

18 Claims, 6 Drawing Sheets

METHOD AND APPARATUS FOR PROCESSING MANAGEMENT INFORMATION

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Computer system developers have responded to these types of data storage and information sharing requirements by crating large complex networks. An example of a network that stores data is referred to as a storage area network or SAN. A typical SAN is a collection of data storage systems that are networked with a number of host computer systems that operate as servers to access data stored in the data storage systems. Other networks include wide are networks such as the Internet and local area network such as smaller corporate networks.

Using a SAN as an example network, elements of a typical conventional storage area network implementation include one or more connectivity devices such as high speed data switches or routers that interconnect the various data storage systems to each other and to one or more host or server computer systems (servers) that require access to speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a network environment may install one or more distributed network management software applications within the network to manage or administer the various elements (i.e., devices, computer systems, storage systems, etc.) that operate within the network. A network manager (i.e., a person) responsible for management of the network operates the network management software application to perform management tasks such as performance monitoring, network analysis and remote configuration and administration of the various components (i.e., software and hardware resources) operating within the network.

A typical conventional network management software application may have several different software components that execute independently of each other on different computer systems but that collectively interoperate together to perform network management. As an example, conventional designs of storage area network management software applications can include console component, a server component, several agent components, storage components and possibly other software components.

Generally, the server component operates as a central control process within the storage area network management application and coordinates communication between the console, storage and agent components. The console component often executes within a dedicated network management workstation to allow a network administrator to visualize and remotely control and manage the various elements within the storage area network that are graphically represented on an interface presented by the console. Agent components execute on various host computer systems such as servers within the storage area network to manage storage area network entities (i.e., managed resources such as devices). As an example, there may be different respective agents specifically designed (e.g., coded) to remotely manage and control certain vendor-specific data storage systems, databases, switches, and so forth.

Agent components receive remote management commands from the server component and apply functionality associated with those management commands to the managed entities within the storage area network for which those agents are designated to manage. Agents are also responsible for collecting or discovering configuration or management data concerning the network resources that those agents managed. This device discovery data collection process can happen in a scheduled or periodic manner, or in response to a command received from the management server.

Conventional agents operate to collect an entire set of management data from a device and then transmit this collected management data set back to a storage component in a single transmission for access by the network management application. As an example, if an agent is responsible for controlling operation of (i.e., managing) a large capacity data storage system (such as an array of disks), the agent can be configured to periodically capture or discover the current state of all managed resources associated with (i.e., operating within) that storage system. The actual data collection process that the agent performs uses software application programming interfaces to query the data storage system for data indicating the current configuration and operational state of the data storage system. The data storage system responds by sending the agent numerous portions of management data, collectively referred to as a management data set, that contain a snapshot of the state of configuration of the data storage system. The conventional agent then transports the entire management data set to the storage component of the management application. The storage component of the network management application receives the entire set of collected management data from the agent and processes and stores this information into a storage area network management database for access by the server and console components. This process is repeated for all agents that operate in the network so that the management application can present the current configuration of managed resources within the network. As an example, the console component can interact with the server component and the network management database to obtain current connectivity and statistical information, such as performance, capacity, load or other data, concerning managed entities within the storage area network that was collected by the agents.

SUMMARY

Conventional mechanisms and techniques for managing the collection and processing of management data for managed resources within a network management application suffer from a variety of deficiencies. In particular, the design of conventional network management applications often uses a large number of agent components that each remotely operate to periodically collect large sets of management data from managed resources. After collection, each conventional agent is responsible for transmitting the entire collected management data set to a store process that processes the management data for placement into managed objects within a management database or other accessible data repository. Depending upon the size and complexity of the network, the processing tasks involved with collecting, transmitting and processing (by the store process) of entire management data sets all at once from many agents can consume significant processing resources. The conventional process does not scale well in time requirements, memory requirements and processing cycle requirements as the number of agents increases.

In particular, large amounts of virtual memory are consumed to handle transactions involving full management data sets. This can result in transaction starvation for other processes vying for the services of the store process. In some cases, process failures can occur if the management data sets become to large or to numerous to process in a short period of time. This is because conventional agents and store processes operate on complete transitive closures of a graph of the data within the management data set.

Embodiments of the invention operate to significantly overcome these and other deficiencies associated with conventional mechanisms and techniques for processing of management data in a network management application. In particular, embodiments of the invention provide agent and store mechanisms and techniques that segregate a management data set into segregated regions. Each segregated region is a respective partial transitive closure of the collected management data taken over a graph representing the entire management data set.

To identify segregated regions, the system disclosed herein uses graph analysis to analyze a graph of the management data set with respect to a model containment hierarchy of a managed object model associated with the collected management data to identify managed object model relationships to be preserved. The system then selects segregated regions of the management data set that correspond to managed object data of managed objects in the managed object model that preserve the identified mandatory managed object model relationships. An agent configured as disclosed herein is able to identify when a partial transitive closure includes a portion of management data if: i) references to other objects in an object model that are related to an object corresponding to that particular portion of management data, as defined in a model containment hierarchy for that object in the object model, are constructible from portions of management data included in that segregated region; and ii) all mandatory object model relationship is maintained between other objects in the object model and an object corresponding to that particular portion of management data. In this manner, the segregated regions contain data for managed objects that have relationships (i.e., references or inheritances) to one another (or one to another).

For each segregated region of management data, an agent configured as disclosed herein then partitioning that segregated region of management data into a set of logical partitions and transfers each logical partition of the segregated region of management data to a network management application in the managed network for access by the network management application. Partitioning thus involves dividing the management data in the segregated region into substantially uniform partitions for transmission to the network management application. In one configuration, this can be done by having the agent apply a hash function that receives a data identifier, such as a alternate key set, associated with a portion of management data with the segregated region of management data and identifying, in response, a specific partition into which the portion of management data is to be placed for transmission to the store process of the network management application. Breaking the segregated regions into partitions, and transferring each partition from the agent to the store process significantly reduces processing resources associated with the store process.

Within the store process, for each logical partition sent from an agent, the store process receives the logical partition of a segregated region of management data at the network management application and obtains, from a management database, a set of managed objects related to management data contained in that logical partition. The store process updates data within the managed objects from the management data within the logical partition and stores the managed objects in the management database. This allows the store process to receive and process each partition individually and only requires the store process to load object data from a management database for those object related to the partition (as opposed to having to load the entire set of object data for an entire management data asset, as is done in conventional systems). This conserves memory used by the store process because once a partition has been converted into managed object data and those objects have been committed back to the managed object database, the store process can clear those objects from memory and begin to process the next partition. Partitions can be sent from an agent and processed either one at a time serially, or in groups, or in parallel by the same, or by several different store processes, depending upon the configuration.

Other embodiments of the invention include computerized devices, such as host and storage system computer systems, workstations or other computerized devices configured to process all of the method operations disclosed herein as embodiments of the invention for both the agent and store processes. In such embodiments, a computerized device includes a memory system, a processor, a communications interface and an interconnection mechanism connecting these components. The memory system is encoded with either an agent application (if the host computer) or a storage application (if the storage computer system) that when performed on the processor, produces an agent process (or store process) that operate as explained herein within the respective host or storage system computerized devices to perform all of the method embodiments and operations explained herein as embodiments of the invention.

Other arrangements of embodiments of the invention that are disclosed herein include software programs to perform the method embodiment steps and operations summarized above and disclosed in detail below for both the agent and/or the store process. More particularly, a computer program product is disclosed that has a computer-readable medium including computer program logic encoded thereon that when performed in a computerized device provides associated operations of the agent, or the store process, each as respectively explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other entities can also provide the system of the invention. The system of the invention can be distributed between many software processes on several computers, or all processes such as the agent and store process could execute on a small set of dedicated computers, or on one computer alone. Though preferred embodiments provide the agent and store process execute on separate computer systems, the particular distribution of the agent and store process is not intended to be limiting.

It is to be understood that the system of the invention can be embodied strictly as a software program, as software and hardware, or as hardware alone. Example embodiments of the invention may be implemented within EMC's Control Center software application that provides management functionality for storage area network resources and in computerized devices that operate the Control Center software. Control Center is manufactured by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Generally, embodiments of the invention provide mechanisms and techniques to allow an agent to collect management data from the resource operating in the managed network. The collected data forms a management data set. Once collected, the agent identifies segregated regions of management data within the management data set. Each segregated region is a respective partial transitive closure of the collected management data set taken over a graph representing the entire management data set. For each segregated region of management data, the agent partitions that segregated region of management data into a set of logical partitions, that in one configuration, are of approximately the same size to allow uniform distribution of the management data into the group of partitions. In one configuration, the partitions include data for objects of the same type in a managed object database maintained by the network management application. The agent transfers each logical partition of the segregated region of management data to a network management application in the managed network for access by the network management application. The partitions, being smaller in size than the entire management data set, allow the store process to require much less memory and processing resources to convert to object data for storage in the managed object database. A store process in the network management application receives the partitions and only needs to keep objects in memory related to partitions that are currently received and being processed, thus saving significant memory and processing resources. Additionally, in one configuration, since the partitions of a segregated region contain data for objects that are related (i.e., are from a common partial transitive closure), updates to the managed object database are made to related groups of objects in a similar time period, and thus sections of the database that are updated using the techniques explained herein are maintained in a more uniform manner as compared to processing an entire management data set all at one time.

Figure 1:
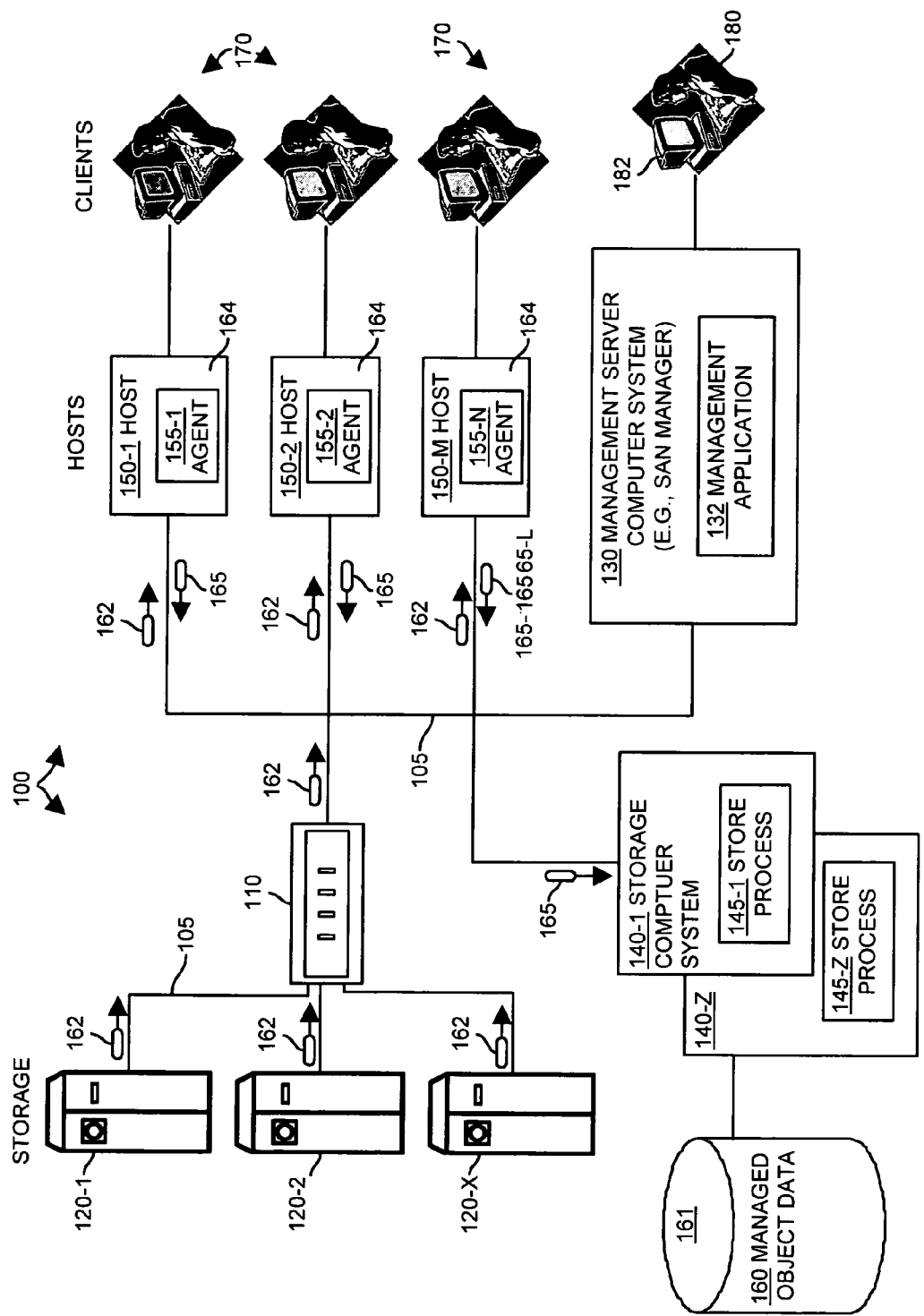
FIG. 1 illustrates an example storage area network and computing system environment including agent and store processes configured to operate according to embodiments of the invention.

FIG. 1 illustrates an example of a networking environment suitable for use in explaining example embodiments of the invention. In this example, the networking environment is a storage area network 100 that includes a communications medium 105 that interconnects a plurality of data storage systems 120-1 through 120-X through one or more connectivity devices 120-Y (e.g., storage area network switches) to a plurality of host computer systems 150-1 through 150-M. According to the general operation of the network shown in FIG. 1, client computer systems 170 can operate various client software applications (not specifically shown) that communicate with server applications (not specifically shown) operating within the host computer systems 150 in order to access data stored within the data storage systems 120 over the storage area network 100.

The storage area network 100 includes a management server computer system 130 that operates a network management application 132. In addition, the storage area network 100 includes one or more storage computer systems 140-1 through 140-Z that operate respective store processes 145-1 through 145-Z configured as disclosed herein. A plurality of agent software processes 155-1 through 155-N operate within one or more of the host computer systems 150-1 through 150-M as further defined herein. Generally, the agents 155 and store processes 145 interoperate with, and are collectively considered parts of the network management application 132. A network administrator 180 (i.e., a person) interacts via a console computer system 182 with the management application 132 executing on the management server computer system 130 in order to remotely administer manageable resources 120 within the storage area network 100 such as the data storage systems 120-1 through 120-X, the connectivity devices 120-Y and the host computer systems 150. Details of agent and store processing as explained herein will now be provided with respect to FIG. 2 and flow charts of processing steps that follow.

Figure 2:
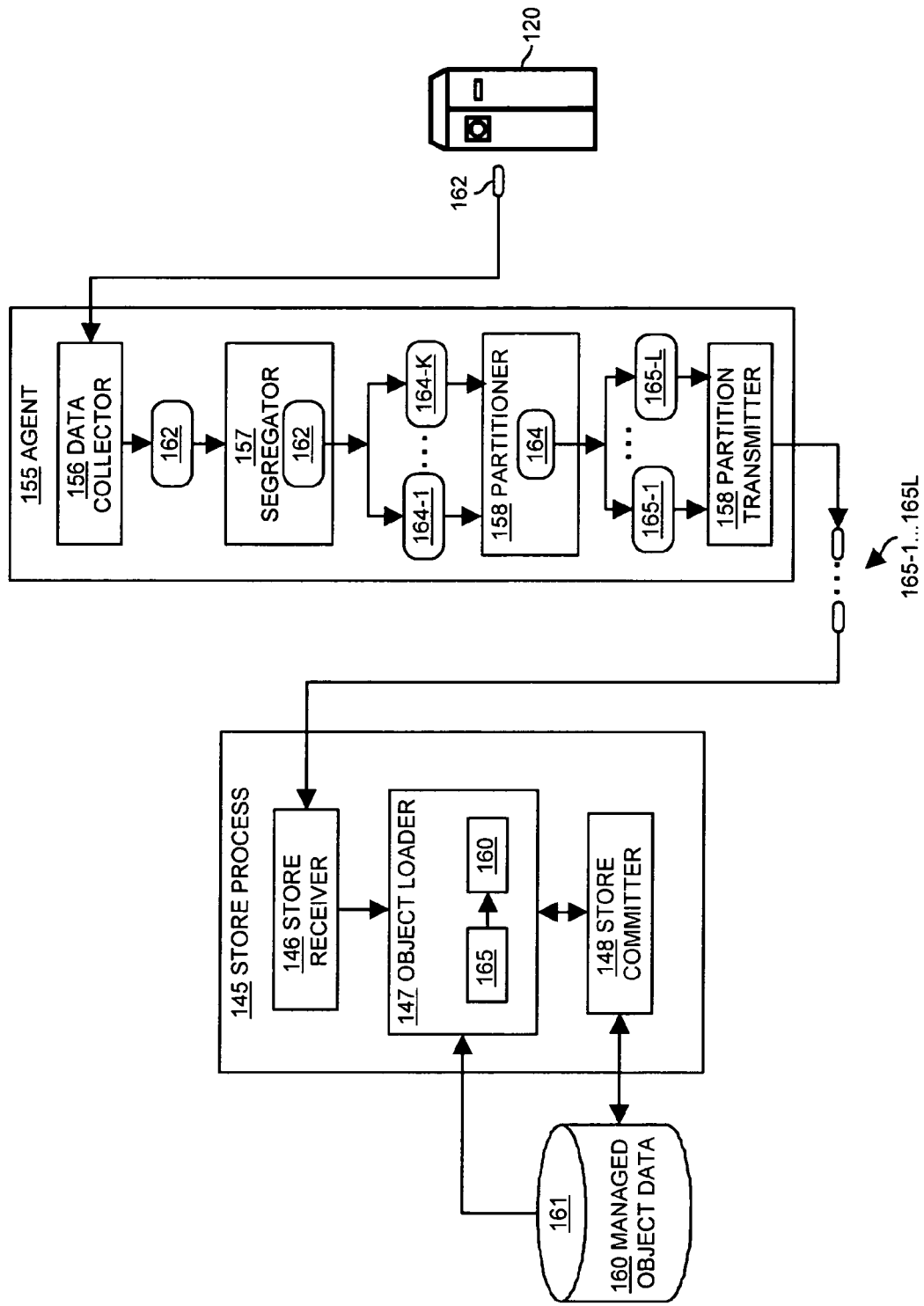
FIG. 2 illustrates an example architecture of agent and store processes configured to operate according to embodiments of the invention.

FIG. 2 illustrates an example configuration of an agent 155 and a store process 145 in accordance with one example embodiment. The example in FIG. 2 illustrates a single agent 155 interacting with a single store process 145, though as shown in FIG. 1, there can be many agents 150 and store processes 145 operational at the same time in the network 100. The agent 155 includes, in this example, a number of software components including a data collector 156, a data segregator 157, a partitioner 158 and a partition transmitter 159. The store process 145 includes, in this example, a store receiver 146, an object loader 147 and a store committer 148. The store process 145 interfaces with a management database 161 and maintains managed objects 160 (i.e., managed object data). The example configuration illustrated in FIGS. 1 and 2 will be used to provide a description of operations of embodiments disclosed herein in conjunction with flow charts of processing step performed by an agent 155 and store process 145.

Configurations disclosed herein generally relate to the processing performed by the agents 155 and the store processes 145 to collect management data sets 162 from managed resources 120 for placement into the management database 160 for access by the management application 132. Generally, an agent 155 collects a management data set 162 from a managed resource 120 and performs as explained herein to segregate the management data set 162 into segregated regions 164-1 through 164-K. In one configuration, each segregated region 164 includes management data collected from the resource for a group of related objects maintained by the store processes 145 within the management object data 160. By related objects, what is meant in one configuration is that the management data selected by an agent 155 for inclusion into a specific segregated region 164 is management data that maintains relationships between objects and references to other objects, in an object model of the managed object data 160, that are related to an object corresponding to that particular portion of management data, as defined in a model containment hierarchy for that object in the object model 160, and those relationships are constructible from portions of management data included in that segregated region 164. Stated differently, data in a segregated region 164 represents a partial transitive closure of data from the management data set 162. In one configuration, the collection of segregated regions 164-1 through 164-K includes all of the data from the management data set 162.

After identifying the data for various segregated regions 164, the agent 155 breaks the segregated regions 164 up into logical partitions 165-1 through 165-L and transfers each logical partition 165 to a store process 145. By sending the data in partitions 165, the processing burden on each store process 145 is minimized since the store processes 145 only need to instantiate, from the managed object database 161, those managed object 160 that need to be populated with data from the current partition(s) 165 being processed. In other words, since the partitions 165 contain data for a much smaller group of objects 160 than the entire collected management data set 162, the store process 145 does not have to process the whole management data set 162 at one time. Rather, using the system explained herein, the store process 145 processes partitions 165 of management data as they are received and as a result, the store processes 145 consume less memory and processor cycles processing the management data partition by partition.

Further details of the system will now be explained with reference to flow charts of processing steps in FIGS. 3 through 6.

Figure 3:
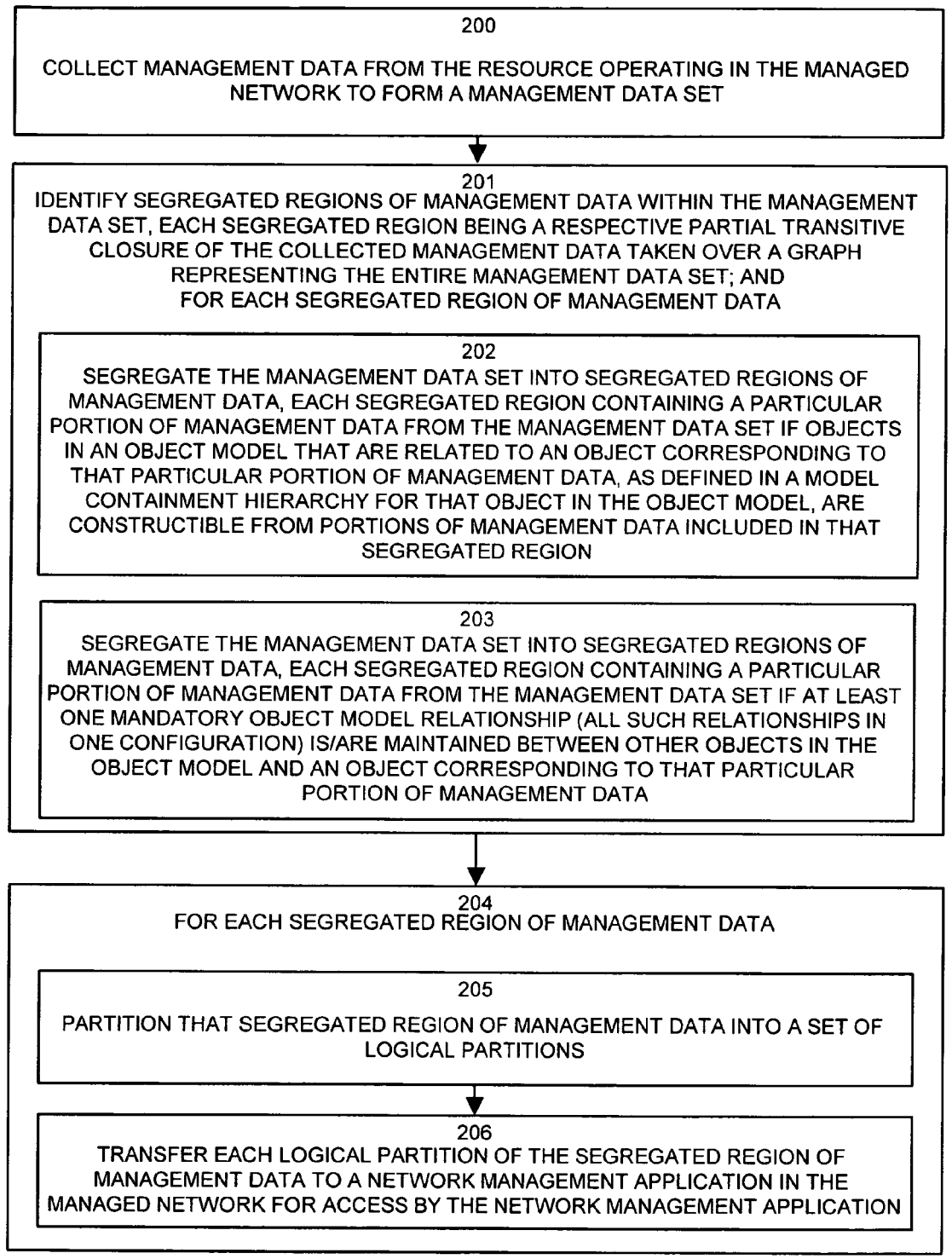
FIG. 3 is a flow chart of processing steps that show the general operation of an agent process configured to process management information according to one example embodiment of the invention.

FIG. 3 shows processing operations performed by an agent 150 to collect management data 162 from a resource (e.g. 120 in FIG. 2) in a managed network 100 in accordance with embodiments disclosed herein.

In step 200, the agent 150 collects management data from the resource 120 operating in the managed network 100 to form a management data set 162. Collection of management data is done by having the data collector 156 execute or engage in management interface protocols between the resource 120 and the agent 155 to query the resource 120 for current configuration and management data. The collective amount of data gathers from a resource 120 is referred to herein as a management data set 162. As an example, if the resource 120 were a data storage system, the management data set 162 might contain data concerning the current configuration and operation of disk drives, ports, adapters cards, logical devices, cache memory and other components that operate within the data storage system. The primary agent 155 responsible for managing that resource can collect the management data set 162 periodically (e.g., nightly at a certain time) or in response to a specific command from the network management application 132.

In step 201, once the management data set 162 has been obtained, the agent 155 operates the data segregator 157 to identify segregated regions 162-1 through 164-K of management data within the management data set 162. Each segregated region 164 being a respective partial transitive closure of the collected management data 162 taken over a graph representing the entire management data set 162. In one configuration, an analysis is performed of the data set's 162 graph with respect to both its model containment hierarchy and its model mandatory relationships for managed objects maintained in the managed object database 161. In an example configuration, a given subset of resource management data 162 is amenable to segregation and partitioning if an only if a) all objects to which this one is related in the model containment hierarchy must be constructible from the segregated and partitioned data sets (this would apply to leaf-node or intermediate-node objects in the model) and b) all objects to which a given object in the segregated and partitioned data set has mandatory model relationships must be constructible from the segregated and partitions data set (this would apply to mapping or relationship objects). In one configuration, and agent 155 has access to the object model for the managed object database 161 (e.g., can be programmed to access this or is statically configured with this information) and can perform this analysis in an automated manner. This is shown in sub-steps 202 and 203.

In step 202, the agent 150 segregates the management data set 162 into segregated regions 164 of management data. Each segregated region 164 contains a particular portion of management data from the management data set if objects in an object model (for the managed object data 160) that are related to an object corresponding to that particular portion of management data, as defined in a model containment hierarchy for that object in the object model, are constructible from portions of management data included in that segregated region.

In step 203, the agent 150 segregates the management data set into segregated regions of management data, with each segregated region containing a particular portion of management data from the management data set 162 if at least one mandatory object model relationship is maintained between other objects in the object model and an object corresponding to that particular portion of management data. In one configuration, steps 202 and 203 result in the identification of partial transitive closures of the management data set that are respective segregated regions.

In step 204, the agent 150 enters a processing loop that occurs for each segregated region 164-1 through 164-K of management data (i.e., steps 205 and 206 occur K times).

In step 205, the agent 150 partitions that segregated region 164 of management data into a set of logical partitions 165-1 through 165-L. Details of this processing will be explained shortly. Generally, however, in one configuration, the agent 150 in step 205 apportions data in the segregated region into respective partitions 165 to evenly distributed that data into substantially sized (i.e., uniform) partitions 165.

In step 206, the agent 150 transfers each logical partition 165-1 through 165-L of the segregated region of management data to the network management application (i.e., to the store process 145) in the managed network for access by the network management application (i.e., for storage within managed objects 160 in the managed object database 161). Such transfers (i.e., L transfers) can take place serially or in parallel, or in groups.

In one configuration, the managed network is a storage area network (SAN) and the resources 120 are managed devices operating in the storage area network such as switches, data storage systems, hosts, host applications, and the like. In this configuration, the agent 150 is an agent responsible for managing the managed devices in the storage area network and performs the above processing steps.

FIG. 3 is a flow chart of processing steps that shows details of processing operations related to creating segregated portions 164 of management data using graph analysis in accordance with one example configuration.

In step 210, the agent 150 identifies segregated regions 164 of management data within the management data set 162 by performing a graph analysis of the collected management data 162 in the management data set to identify nodes of management data in a graph where the entire management data set can be segregated. Details of this process according to one example configuration are shown in steps 211 and 212.

In step 211, the agent 150 analyzes a graph of the management data set 162 with respect to a model containment hierarchy of a managed object model (of the database 161) associated with the collected management data to identify managed object model relationships to be preserved.

In step 212, based on this analysis, the agent 150 selects segregated regions of the management data set 162 that correspond to managed object data of managed objects 160 in the managed object model (i.e., 161) that preserve the identified mandatory managed object model relationships. Accordingly, as noted briefly above, performing a graph analysis of the collected management data in the management data set comprises includes identifying, as respective segregated regions 164, partial transitive closures within the graph that contain particular portions of management data from the management data set 164. Each partial transitive closure includes a portion of management data if: i) references to other objects in an object model that are related to an object corresponding to that particular portion of management data, as defined in a model containment hierarchy for that object in the object model, are constructible from portions of management data included in that segregated region; and ii) if at least one mandatory object model relationship is maintained between other objects in the object model and an object corresponding to that particular portion of management data. In this manner, each segregated region maintains data for objects that either relate to (i.e., that reference) one another, or for objects in which at least one object references another.

Note that in one configuration, graph analysis can be performed by an agent developer (i.e., a person) who then statically configures (i.e., hardcodes) an agent 150 with the identification of the data portions within a management data set 162 that are to be included in each segregated region.

Figure 4:
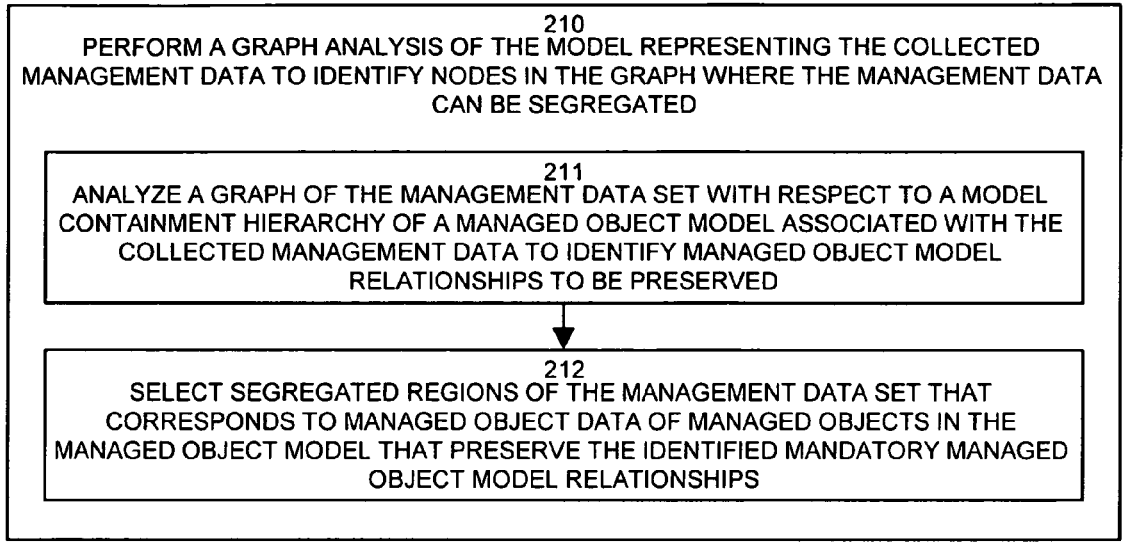
FIG. 4 is a flow chart of processing steps that show the general operation of performing graph analysis to identify segregated regions of a management data set according to one example embodiment of the invention.
Figure 5:
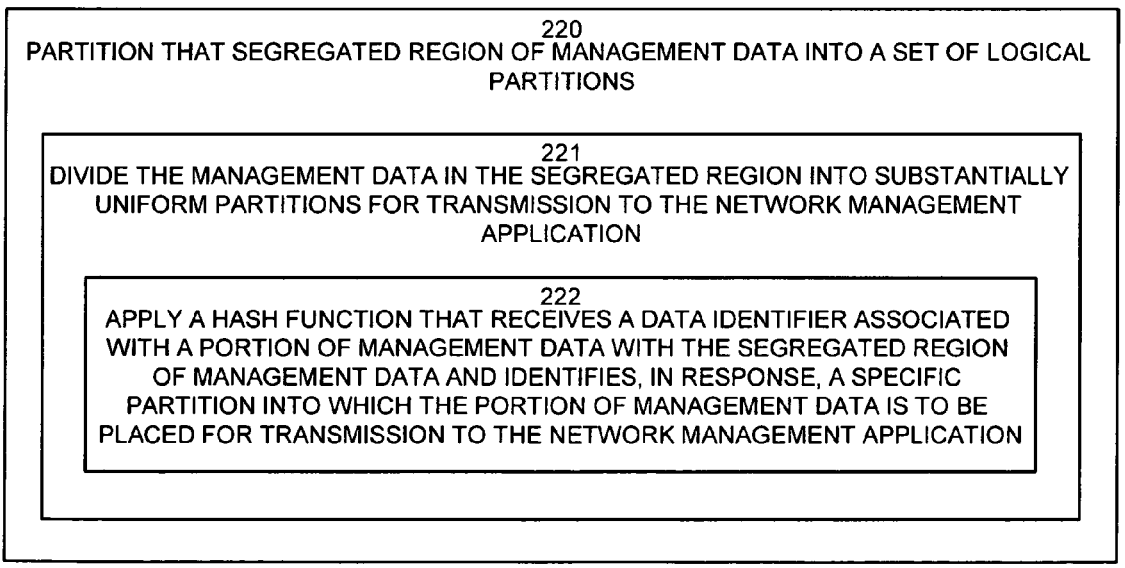
FIG. 5 is a flow chart of processing steps that show details of operation to partition a management data set into partitions according to one example embodiments of the invention.

FIG. 4 is a flow chart of processing steps that shows details of processing operations performed by an agent 150 related to partitioning a segregated region 164 of management data in accordance with one example configuration.

In step 220, the agent 150 partitions a segregated region 164 of management data into a set of logical partitions 165-1 through 165-L. Details of this processing are shown in sub-steps 221 and 222.

In step 221, the agent 150 divides the management data in the segregated region 164 into substantially uniform partitions 165 for transmission to the network management application store process 145.

In step 222, to divide the segregated region 164 into partitions 165, the agent 150 applies a hash function that receives (i.e., identifies) a data identifier (such as a database key) associated with a portion of management data with the segregated region of management data and identifies, in response, a specific partition into which the portion of management data is to be placed for transmission to the network management application. As an example, a portion of management data in the segregated region may have a database key identifier that is input to the hash function to identify a specific partition number 1 through L into which that portion of management data from the segregated region 164 is to be placed for transmission to the store process 145. In one configuration, each partition 1 through L thus contains objects of the same type.

Figure 6:
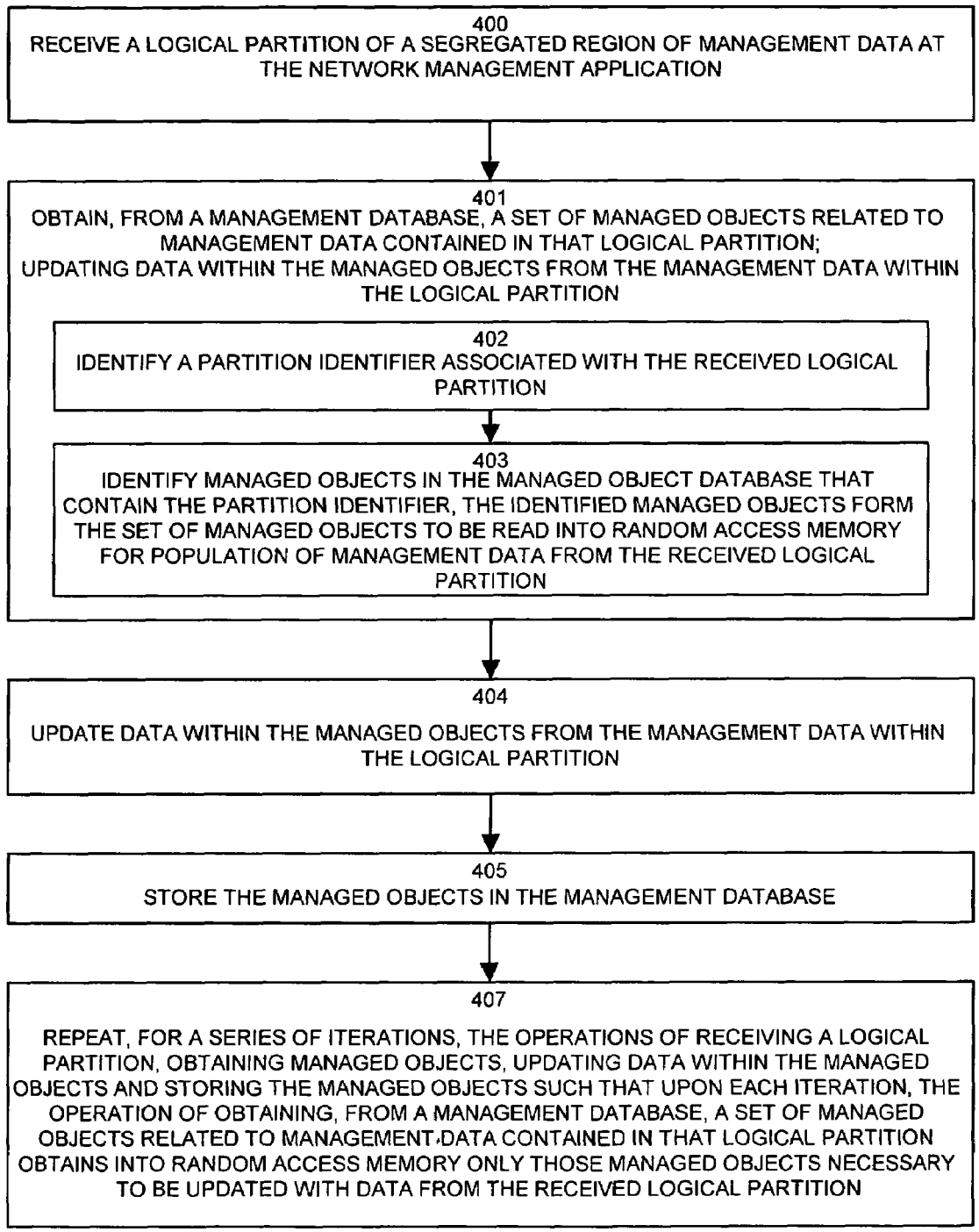
FIG. 6 is a flow chart of processing steps that show details of operation of a store process configured to process partitions transferred by the agent process to update a management database according to embodiments of the invention.

FIG. 6 is a flow chart of processing steps that shows details of processing operations performed by a store process 145 for receiving and processing partitions 165 in accordance with one example configuration.

In step 400, the store process 145 receives a logical partition 165 of a segregated region 164 of management data.

In step 401, the store process 145 obtains, from a management database, a set of managed objects 160 related to management data contained in that logical partition 165. Note that the In step 402, the store process 145 identifies a partition identifier associated with the received logical partition.

In step 403, the store process 145 identifies and loads into memory managed objects 160 in the managed object database 161 that contain the partition identifier 1 through L. The identified managed objects 160 form the set of managed objects to be read into random access memory for population of management data from the received logical partition 165. In one configuration, each partition has a partition number (e.g., 1 through L, which is the output value of the hash function performed by the agent 155 when placing management data from a segregated region 164 into specific partitions 165). When the store process 145 receives a particular partition 165-1 through 165-L, the store process 145 loads, into random access memory, a set of managed objects 160 that each contain that partition number. In one configuration, since all object data in a partition 165 is of the same type, the store process 145 loads all objects of the same type corresponding to the partition number into memory.

In other words, when managed objects 160 are stored in the managed object database 161, they include the partition identifier, such as the partition number 1 through L from which their managed object data was obtained from an agent 155, or a type field that corresponds to the partition identifier. By loading only those objects having that partition number, or that partition type (i.e., the object type of all data in a specific partition 165), the store process 145 only needs to store in memory substantially less amounts of management data than an entire amount of management data in the management data set 162 collected from the resource operating in the storage area network. Specifically, the store only needs to load those objects 160 that have the same partition number 1 through L or type as the partition (or the type of data in a partition) that was just received and is being processed for conversion of its data into managed object data 160.

In step 404, the store process 145 updates data within the managed objects 160 from the management data within the logical partition 165. This process involves populating the managed object data values with the data from the partition 165.

In step 405, the store process 145 stores the managed objects 160 in the management database. This commits the managed objects to the database 160.

In step 406, the store process 145 repeats, for a series of iterations (i.e., equal to the number of partitions L for a particular segregated region 1 through K), the operations of steps 401 through 405 such that upon each iteration, the operation of obtaining, from a management database 161, a set of managed objects 160 related to management data contained in that logical partition 165 obtains into random access memory only those managed objects 160 necessary to be updated with data from the received logical partition 165. This process is thus repeated for all partitions for a segregated region. The entire processing can then be repeated for each segregated region 164 that is partitioned and transferred to the store process 145.

Note that in one configuration, a store process 145 can detect, in real-time, if an agent 155 is equipped with partitioning functionality. This allows the store process 145 to remain backward compatible with agents 155 that do not support segregation and partitioning functionality as explained herein. Thus a store process 145 can operate in a network that uses conventional agents as well as agents that operate as explained herein.

Figure 7:
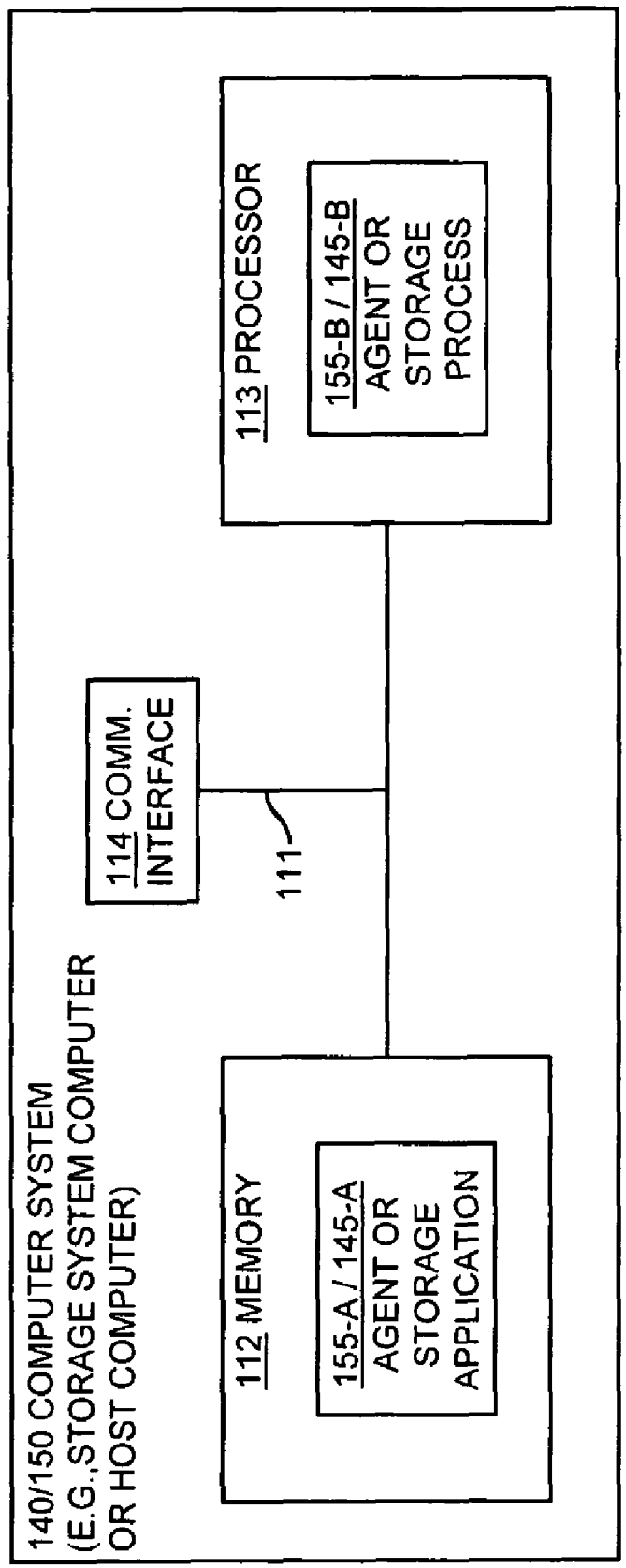
FIG. 7 illustrates example architecture of a computer system and a computer readable medium configured in accordance with example embodiments of the invention.

FIG. 7 illustrates example architectures of a computer system that is configured as either a host computer system 150 or a storage computer system 140. The computer systems 140 and 150 may be any type of computerized system such as a personal computer, workstation, portable computing device, mainframe, server or the like. In this example, each includes an interconnection mechanism 111 that couples a memory system 112, a processor 113, and a communications interface 114. The communications interface 114 allows the computer systems 140 and 150 to communicate with each other over the storage area network 100.

The memory system 112 may be any type of computer readable medium that is encoded with an application 145-A, 155-A that represents software logic code such as data and/or logic instructions (e.g., stored in the memory or on another computer readable medium such as a disk) that embody the processing functionality of embodiments of the invention for either the agent 155 or the store process 145 as explained above. The processor 113 can access the memory system 112 via the interconnection mechanism 111 in order to launch, run, execute, interpret or otherwise perform the logic instructions of the applications 145-A (for the storage computer) or 155-A (for the host) in order to produce a corresponding agent or store process 155-B, 145-B. In other words, the agent and store processes 155-B and 145-B represent one or more portions of the agent and storage application 155-A and 145-A1 performing within or upon the processor 113 in the computer system. It is to be understood that the agent 155 and storage process 145 operating as explained in former examples are represented in FIG. 7 by either one or both of the agent and storage application 155-A, 145-A and/or the process 145-B, 155-B.

Is to be understood that embodiments of the invention include the applications (i.e., the un-executed or non-performing logic instructions and/or data) encoded within a computer readable medium such as a floppy disk, hard disk or in an optical medium, or in a memory system such as in firmware, read only memory (ROM), or, as in this example, as executable code within the memory system 112 (e.g., within random access memory or RAM). It is also to be understood that other embodiments of the invention can provide the applications operating within the processor 113 as the processes 145-B, 155-B. While not shown in this example, those skilled in the art will understand that the computer systems 140 and/or 150 may include other processes and/or software and hardware components, such as an operating system, which have been left out of this illustration for ease of description of the invention.

Other alternative arrangements of the invention include rearranging the processing steps explained above in the flow charts in such a way that the overall effect of the invention is the same. It is to be thus understood by those skilled in the art that the particular arrangement of processing steps in many instances does not specify implementation of embodiments of the invention. As such, those skilled in the art of software development and computer-related technologies will understand that there can be many ways and orders of representing the processing operations explained above and such alternative software code will still achieve the overall effects explained herein. In addition, embodiments of the invention are not limited to operation on the computer systems shown above. The agents, store processes and management server (including change manager) can operate on shared computing resources, or can be distributed among any number of computer systems. Furthermore, embodiments of the invention are not limited to operation in a storage area network management application, but are intended to be generally applicable to any type of network management application. Accordingly, embodiments of the invention are not limited to the processing arrangements explained above.

What is claimed is:

1. In a computerized device including a memory system and a processor, a method of collecting management data from a resource in a managed network, the method comprising:

collecting management data from the resource operating in the managed network to form a management data set;

identifying segregated regions of management data within the management data set, each segregated region being a respective partial transitive closure of the collected management data taken over a graph representing the entire management data set, by segregating the management data set into segregated regions of management data, each segregated region containing a particular portion of management data from the management data set based upon objects in an object model having a relationship to an object corresponding to that particular portion of management data, as defined in a model containment hierarchy for that object in the object model, are constructible from portions of management data included in that segregated region; and for each segregated region of management data:
  i) partitioning that segregated region of management data into a set of logical partitions; and
  ii) transferring each logical partition of the segregated region of management data to a network management application in the managed network for access by the network management application.

2. The method of claim 1 wherein identifying segregated regions of management data within the management data set further comprises:

segregating the management data set into segregated regions of management data, each segregated region containing a particular portion of management data from the management data set based upon at least one mandatory object model relationship being maintained between other objects in the object model and an object corresponding to that particular portion of management data.

3. The method of claim 2 wherein partitioning that segregated region of management data into a set of logical partitions comprises:
dividing the management data in the segregated region into uniformly sized partitions for transmission to the network management application.

4. The method of claim 3 wherein dividing the management data in the segregated region into uniformly sized partitions for transmission to the network management application comprises:
applying a hash function that receives a data identifier associated with a portion of management data with the segregated region of management data and identifies, in response, a specific partition into which the portion of management data is to be placed for transmission to the network management application.

5. The method of claim 4 wherein:
the data identifier used by the hash function to identify a partition to transport the portion of management data is a database key associated with the portion of management data;
wherein all portions of management data in a single segregated region derive from the same object type within an object model that maintains that management data within the network management application;
and wherein all partitions used to transport management data for a segregated region to the network management application provide a uniformly sized distribution of the management data within that segregated region.

6. The method of claim 5 wherein obtaining, from a management database, a set of managed objects related to management data contained in that logical partition comprises:
identifying a partition identifier associated with the received logical partition;
identifying managed objects in the managed object database that contain the partition identifier, the identified managed object forming the set of managed objects to be read into random access memory for population of management data from the received logical partition.

7. The method of claim 2 wherein the managed network is a storage area network and wherein the resource is a managed device operating in the storage area network and wherein the method comprises:
performing the operations of collecting management data, identifying segregated regions of management data, partitioning segregated regions of management data and transferring each logical partition of the segregated region of management data by an agent responsible for managing the managed device in the storage area network.

8. The method of claim 1 wherein identifying segregated regions of management data within the management data set comprises:
segregating the management data set into segregated regions of management data, each segregated region containing a particular portion of management data from the management data set based upon at least one mandatory object model relationship being maintained between objects in the object model and an object corresponding to that particular portion of management data.

9. The method of claim 1 wherein identifying segregated regions of management data within the management data set comprises:
performing a graph analysis of a model representing the collected management data to identify nodes in the graph where the management data set can be segregated.

10. The method of claim 9 wherein performing a graph analysis of the collected management data in the management data set comprises:
analyzing a graph of the management data set with respect to a model containment hierarchy of a managed object model associated with the collected management data to identify managed object model relationships to be preserved;
selecting segregated regions of the management data set that correspond to managed object data of managed objects in the managed object model that preserve the identified mandatory managed object model relationships.

11. The method of claim 9 wherein performing a graph analysis of the collected management data in the management data set comprises:
identifying, as respective segregated regions, partial transitive closures within the graph that contain particular portions of management data from the management data set, the partial transitive closure including a portion of management data based upon:
i) references to other objects in an object model that are related to an object corresponding to that particular portion of management data, as defined in a model containment hierarchy for that object in the object model, being constructed from portions of management data included in that segregated region; and
ii) at least one mandatory object model relationship being maintained between other objects in the object model and an object corresponding to that particular portion of management data.

12. The method of claim 1 comprising:
receiving a logical partition of a segregated region of management data at the network management application;
obtaining, from a management database, a set of managed objects related to management data contained in that logical partition;
updating data within the managed objects from the management data within the logical partition; and
storing the managed objects in the management database.

13. The method of claim 12 comprising:
repeating, for a series of iterations, the operations of receiving a logical partition, obtaining managed objects, updating data within the managed objects and storing the managed objects such that upon each iteration, the operation of obtaining, from a management database, a set of managed objects related to management data contained in that logical partition obtains into random access memory only those managed objects necessary to be updated with data from the received logical partition.

14. The method of claim 13 comprising allowing the network management application to maintain in the random access memory, at any given time, a complete set of managed objects that store less amounts of management data than an entire amount of management data in the management data set collected from the resource operating in the storage area network.

15. A computer system comprising:
a memory;
a processor;
a communications interface;

an interconnection mechanism coupling the memory, the processor and the communications interface;

wherein the memory is encoded with an agent application that when performed on the processor, provides an agent process for processing management data, the agent process causing the computer system to perform the operations of:

collecting management data from the resource operating in the managed network to form a management data set;

identifying segregated regions of management data within the management data set, each segregated region being a respective partial transitive closure of the collected management data taken over a graph representing the entire management data set, by segregating the management data set into segregated regions of management data, each segregated region containing a particular portion of management data from the management data set based upon objects in an object model having a relationship to an object corresponding to that particular portion of management data, as defined in a model containment hierarchy for that object in the object model, are constructible from portions of management data included in that segregated region; and for each segregated region of management data:
i) partitioning that segregated region of management data into a set of logical partitions; and
ii) transferring each logical partition of the segregated region of management data to a network management application in the managed network for access by the network management application.

16. The computer system of claim 15 wherein when the computer system performs the operation of identifying segregated regions of management data within the management data set further, the computer system performs the operation of:

segregating the management data set into segregated regions of management data, each segregated region containing a particular portion of management data from the management data set based upon at least one mandatory object model relationship being maintained between other objects in the object model and an object corresponding to that particular portion of management data.

17. The computer system of claim 16 wherein when the computer system performs the operation of partitioning that segregated region of management data into a set of logical partitions, the computer system performs the operation of:

dividing the management data in the segregated region into uniformly sized partitions for transmission to the network management application, dividing including applying a hash function that receives a data identifier associated with a portion of management data with the segregated region of management data and identifies, in response, a specific partition into which the portion of management data is to be placed for transmission to the network management application.

18. A computer program product, stored on a computer-readable storage medium, including computer program logic encoded thereon that, when executed on a processor of a computer system, provides an agent for processing management data by causing the computer system to perform the operations of:

collecting management data from the resource operating in the managed network to form a management data set;

identifying segregated regions of management data within the management data set, each segregated region being a respective partial transitive closure of the collected management data taken over a graph representing the entire management data set, by segregating the management data set into segregated regions of management data, each segregated region containing a particular portion of management data from the management data set based upon objects in an object model having a relationship to an object corresponding to that particular portion of management data, as defined in a model containment hierarchy for that object in the object model, are constructible from portions of management data included in that segregated region; and for each segregated region of management data:
i) partitioning that segregated region of management data into a set of logical partitions; and
ii) transferring each logical partition of the segregated region of management data to a network management application in the managed network for access by the network management application.

* * * * *